J. I. ARBOGAST.
METHOD OF PRODUCING WIRE GLASS ARTICLES AND VESSELS.
APPLICATION FILED OCT. 4, 1907.
960,146.
Patented May 31, 1910.
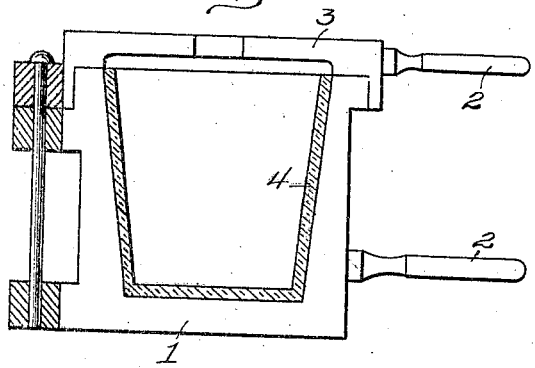
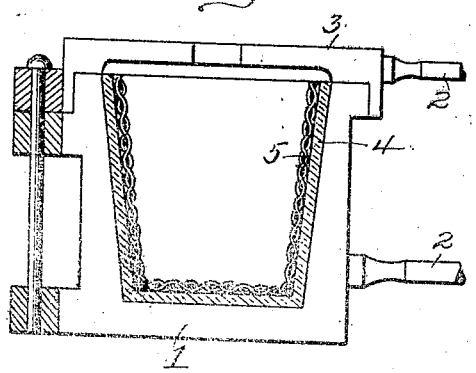
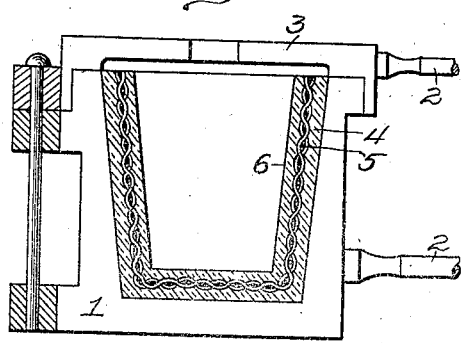
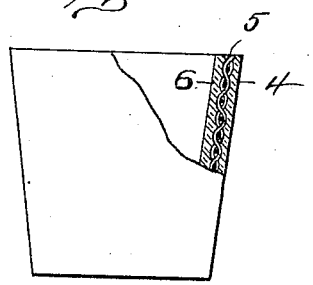
Witnesses
Samuel Payne
R. H. Butler
Inventor
John I. Arbogast.
By H. C. Evert
Attorneys

UNITED STATES PATENT OFFICE.

JOHN I. ARBOGAST, OF PITTSBURG, PENNSYLVANIA, ASSIGNOR OF ONE-HALF TO HENRY L. COLLINS, OF PITTSBURG, PENNSYLVANIA.

METHOD OF PRODUCING WIRE-GLASS ARTICLES AND VESSELS.

960,146.     Specification of Letters Patent.     Patented May 31, 1910.

Application filed October 4, 1907. Serial No. 395,827.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Methods of Producing Wire-Glass Articles and Vessels, of which the following is a specification, reference being had therein to the accompanying drawing.

This invention relates to a method of producing wire glass articles, and its object is to provide a simple method whereby shades, basins, buckets, bowls, oil cans, and similar vessels may be inexpensively manufactured, the product comprising a vessel consisting of two layers or thicknesses of glass with a layer or thickness of wire mesh interposed between them.

The improved method consists in blowing a gathering of glass within a mold to provide the outer shell or thickness of the vessel, then fitting a wire mesh basket within the blown shell, and finally blowing another gathering of glass within the wire mesh to form the inner shell or surface of the vessel.

The improved method will be more specifically described hereinafter in connection with the accompanying drawing which forms a part of this specification, and its features of novelty will be defined in the appended claim.

In the drawing Figure 1 is a longitudinal sectional view of a mold adapted for use in carrying out my improved method, showing the outside layer of glass blown in position within the mold. Fig. 2 is a similar view showing the wire mesh positioned within the outside glass layer. Fig. 3 is a view similar to Figs. 1 and 2 showing the completed article within the mold, and Fig. 4 is an elevation of the article produced within the mold partly broken away and partly in section.

The reference numeral 1 designates the body of the mold provided with handles 2 and a blow over 3.

The initial step in my improved method is to blow a gathering of glass into the mold 1 to form a cylindrical shell 4 which constitutes the outer layer of the completed article. I then place a basket 5 of wire mesh within the shell 4 and as a final step in the method blow another gathering of glass within the wire mesh to provide the inner layer 6 of the vessel.

It will be apparent that the two layers of glass which inclose and cover the wire mesh will, when the inner layer or shell is of sufficient temperature and quantity readily amalgamate, forming when cooled, a solid homogeneous body with the mesh embedded therein.

The article produced provides a substantial vessel adapted for a variety of uses, for domestic or other purposes.

The product of the improved method here shown is a very simple embodiment of the invention and it will be understood that the invention is not restricted to the production of any specific form of vessel or article, but includes all such vessels or articles as are capable of being blown in a mold in accordance with the above description.

Having fully described my invention what I claim as new and desire to secure by Letters Patent is, The herein described method of producing glass finished vessels of a predetermined shape and size without reheating or further treatment, consisting in blowing within a suitable mold corresponding in shape to the shape of the vessel to be formed a quantity of molten glass so as to form an outer shell having the shape of the finished vessel, fitting within said blown shell a wire mesh basket corresponding in shape to the shape of the shell, and then blowing and simultaneously shaping within the wire basket a second shell of molten glass of sufficient temperature and in sufficient quantity that said second or inner shell amalgamates with the outer shell and envelops the wire basket.

In testimony whereof I affix my signature in the presence of two witnesses.

JOHN I. ARBOGAST.

Witnesses:
   F. C. ZERCHER,
   F. O. McCLEARY.